(12) United States Patent
Kim et al.

(10) Patent No.: US 7,969,519 B2
(45) Date of Patent: Jun. 28, 2011

(54) LIQUID CRYSTAL DISPLAY DEVICE AND METHOD OF FABRICATING THE SAME

(75) Inventors: Kyung Wook Kim, Seoul (KR);
Sang-Ki Kwak, Cheonan-si (KR);
Yeo-Geon Yoon, Asan-si (KR);
Hyuk-Jin Kim, Cheonan-si (KR)

(73) Assignee: Samsung Electronics Co., Ltd. (KR)

( * ) Notice: Subject to any disclaimer, the term of this patent is extended or adjusted under 35 U.S.C. 154(b) by 988 days.

(21) Appl. No.: 11/671,790

(22) Filed: Feb. 6, 2007

(65) Prior Publication Data
US 2007/0182875 A1   Aug. 9, 2007

(30) Foreign Application Priority Data
Feb. 6, 2006   (KR) ................. 10-2006-0011111

(51) Int. Cl.
*G02F 1/1343* (2006.01)

(52) U.S. Cl. ....................... 349/38; 349/110; 349/111

(58) Field of Classification Search ............... 349/38, 349/110–111
See application file for complete search history.

(56) References Cited

U.S. PATENT DOCUMENTS 6,809,335 B2   10/2004   Park
2005/0029521 A1*   2/2005   Yamasaki et al. ............... 257/72

FOREIGN PATENT DOCUMENTS

CN          1460885 A    12/2003

* cited by examiner

*Primary Examiner* — David Nelms
*Assistant Examiner* — Phu Vu
(74) *Attorney, Agent, or Firm* — Cantor Colburn LLP

(57) ABSTRACT

A liquid crystal display (LCD) device and a method of fabricating the same includes a gate line arranged in one direction, a data line arranged in a perpendicular direction to the gate line, a pixel electrode arranged in a pixel region defined by the gate and data lines and having a diagonal side adjacent to a crossing portion of the gate and data lines, and a light blocking pattern arranged in a parallel direction with respect to the diagonal side of the pixel electrode and preventing light leakage.

14 Claims, 8 Drawing Sheets

LIQUID CRYSTAL DISPLAY DEVICE AND METHOD OF FABRICATING THE SAME

This application claims priority to and the benefit of Korean Patent Application No. 2006-11111, filed Feb. 6, 2006, and all the benefits accruing therefrom under 35 U.S.C. §119, the disclosure of which is incorporated herein by reference in its entirety.

BACKGROUND OF THE INVENTION

1. Field of the Invention

The present invention relates generally to a liquid crystal display ("LCD") device and, more particularly, to an LCD device in which a display defect resulting from a texture defect occurring around a side of a pixel electrode due to column spacer movement is reduced or effectively prevented, and a method of fabricating the same.

2. Description of the Related Art

An "LCD" device is widely used in products such as cellular phones, computer monitors, televisions, etc., and is increasingly in demand due to its advantages of compact size, light weight, and low power consumption.

A typical LCD device comprises a color filter substrate and a thin film transistor ("TFT") substrate with a liquid crystal layer interposed therebetween. The color filter substrate comprises a common electrode and a color filter, and the TFT substrate comprises a TFT and a pixel electrode. Different electric potentials are applied to the pixel electrode and the common electrode to change the orientation of liquid crystal molecules, so that the transmissivity of light is adjusted to display an image.

Recently, a vertically aligned ("VA") mode LCD device (in which a longitudinal or major axis of a liquid crystal molecule is perpendicular to upper and lower substrates when an electric field is not applied thereto) has attracted attention due the high contrast ratio and wide viewing angle capabilities thereof.

Presently, there are two known methods of obtaining a wide viewing angle in VA mode LCD device. The first method is to form an incision pattern in an electrode, while the second method is to form a projection in an electrode. Both of the two methods form a fringe field to equally distribute the tilt direction of liquid crystal molecules in four directions to thereby obtain the wide viewing angle. A patterned vertically aligned ("PVA") mode for forming the incision pattern is also used as a wide viewing angle technique in lieu of an in-plane switching ("IPS") mode.

The PVA mode has a relatively fast response characteristic as compared to a twisted nematic ("TN") mode, since there is no torsion in movement of the liquid crystal molecule and the liquid crystal molecule is splayed in a perpendicular direction to an electric field, or moves only by bending elasticity.

However, if an upper substrate including a black matrix and a lower substrate including a TFT are misaligned or moved by an external physical shock or impact, the black matrix is also moved. In this instance, a texture control defect may occur due to light leakage, thereby leading to a display defect in the LCD device. In particular, if a column spacer for maintaining a cell gap between the upper substrate and the lower substrate is formed at a region adjacent to a blue pixel region and the column spacer is shocked or impacted, the texture defect occurs because light leakage is more increased than at other regions due to a movement of the column spacer in the direction of a pixel region. Even where the column spacer is restored to its original position, the text defect of the blue pixel region is still not cured. As a result, the defect may result in a deterioration of the brightness of the display, and may also result in a horizontal line defect and a yellowish phenomenon.

BRIEF SUMMARY OF THE INVENTION

Aspects of the present invention provide an LCD device in which a display defect is prevented by modifying a shape of a portion of a storage extending portion or a shape of a portion of a bridge electrode for connecting the storage extending portion and a storage line which are located in a region where the column spacer is arranged, and a method of fabricating the same.

One exemplary embodiment of the present invention provides an LCD device, comprising a gate line arranged in one direction, a data line arranged in a perpendicular direction to the gate line, a pixel electrode arranged in a pixel region defined by the gate and data lines and having a diagonal side adjacent to a crossing portion of the gate and data lines, and a light blocking pattern arranged in a parallel direction with respect to the diagonal side of the pixel electrode and preventing light leakage.

In one exemplary embodiment, the light blocking pattern is formed from the same metal on the same plane as the gate line.

In one exemplary embodiment, the light blocking pattern comprises a first storage line arranged in a parallel direction with respect to the gate line to supply a storage voltage, and a storage extending portion arranged in a parallel direction with respect to the data line and extending from the first storage line, wherein the storage extending portion overlaps one side of the pixel electrode.

In one exemplary embodiment, the LCD device further comprises a bridge electrode electrically connecting the storage extending portion of the first storage line with a second storage line.

In one exemplary embodiment, the bridge electrode is formed from the same metal on the same plane as the pixel electrode.

In one exemplary embodiment, the light blocking pattern is formed from the same metal on the same plane as the pixel electrode.

In one exemplary embodiment, the LCD device further comprises a first storage line arranged in a parallel direction with respect to the gate line to supply a storage voltage, and a storage extending portion arranged in a parallel direction with respect to the data line and extending from the first storage line, wherein the storage extending portion overlaps one side of the pixel electrode, and wherein the light blocking pattern electrically connects the storage extending portion to a second storage line and has a diagonal side which is substantially parallel with respect to the diagonal side of the pixel electrode.

In one exemplary embodiment, the light blocking pattern receives a storage voltage.

Another exemplary embodiment of the present invention provides a method of forming an LCD device comprising forming a gate line arranged in one direction and a data line arranged in a perpendicular direction to the gate line, forming a pixel electrode arranged in a pixel region defined by the gate and data lines and having a diagonal side adjacent to a crossing portion of the gate and data lines, and forming a light blocking pattern arranged in a parallel direction with respect to the diagonal side of the pixel electrode.

In one exemplary embodiment, forming the light blocking pattern comprises forming a first storage line arranged in a parallel direction with respect to the gate line and formed from the same metal on the same plane as the gate line, and forming a storage extending portion arranged in a parallel direction with respect to the data line and extending from the first storage line, wherein the storage extending portion overlaps one side of the pixel electrode.

In one exemplary embodiment, forming the light blocking pattern further comprises forming a part of the storage line to be substantially parallel with respect to the diagonal side of the pixel electrode, and forming one side of an end of the storage extending portion to be substantially parallel with respect to the diagonal side of the pixel electrode.

In one exemplary embodiment, the method further comprises forming a bridge electrode electrically connecting the storage extending portion of the first storage line with a second storage line.

In one exemplary embodiment, forming the bridge electrode comprises forming one side of the bridge electrode to be substantially parallel with respect to the diagonal side of the pixel electrode with the same metal on the same plane as the pixel electrode.

In one exemplary embodiment, the light blocking pattern is formed from the same metal on the same plane as the pixel electrode while forming the pixel electrode.

In one exemplary embodiment, the method further comprises forming a first storage line arranged in a parallel direction with respect to the gate line, forming a storage extending portion arranged in a parallel direction with respect to the data line and extending from the first storage line, and forming the light blocking pattern electrically connecting the storage extending portion to a second storage line.

BRIEF DESCRIPTION OF THE DRAWINGS

The above and other aspects, features and advantages of the present invention will be described in reference to certain exemplary embodiments thereof with reference to the attached drawings in which.

DETAILED DESCRIPTION OF THE INVENTION

Figure 1:
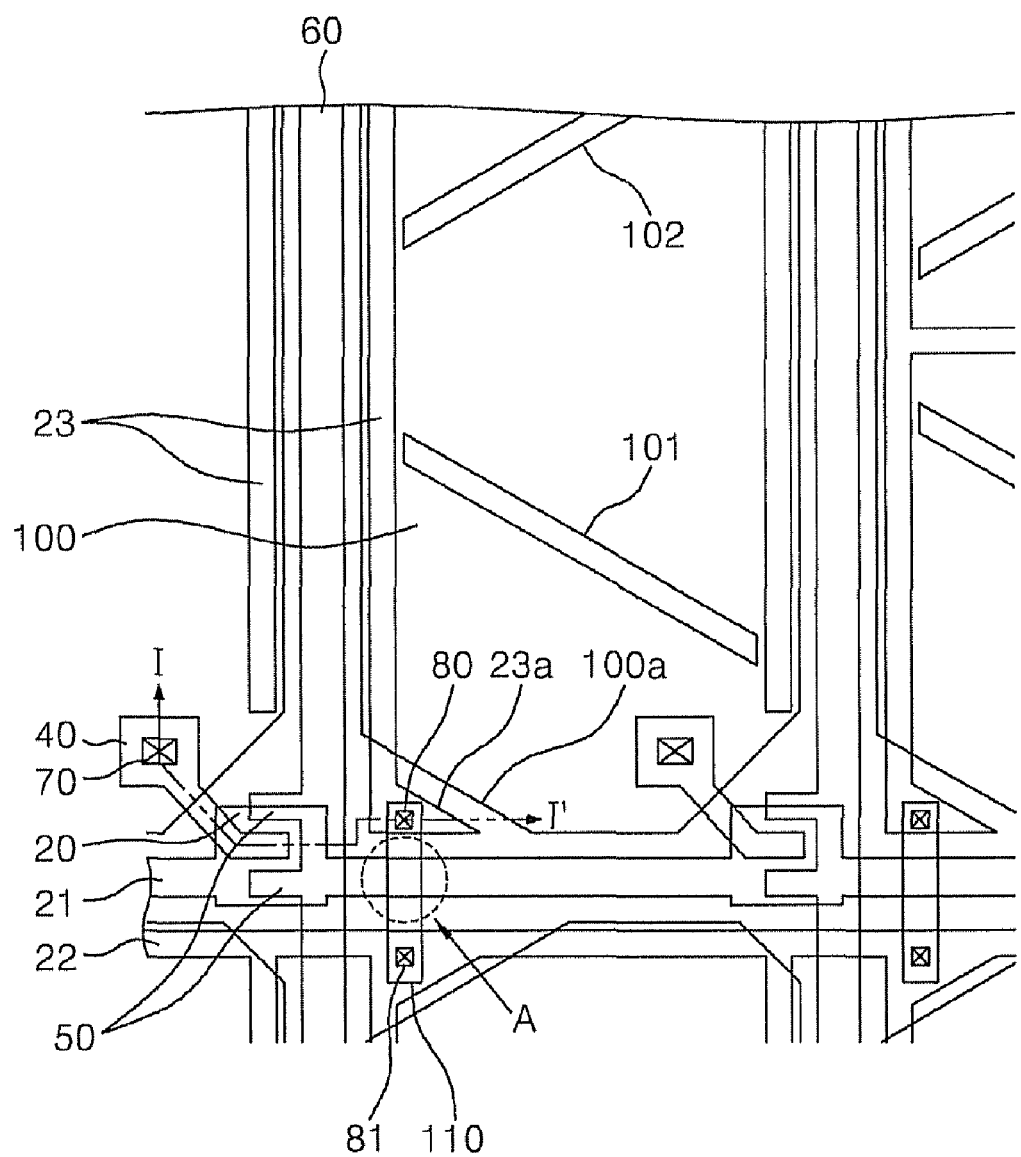
FIG. 1 is a top view illustrating a TFT substrate according to one exemplary embodiment of the present invention.

The present invention is described more fully hereinafter with reference to the accompanying drawings, in which exemplary embodiments of the invention are shown. The present invention may, however, be embodied in many different forms and should not be construed as limited to the exemplary embodiments set forth herein. Rather, these exemplary embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "lower" other elements or features would then be oriented "above" or "upper" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

Figure 2:
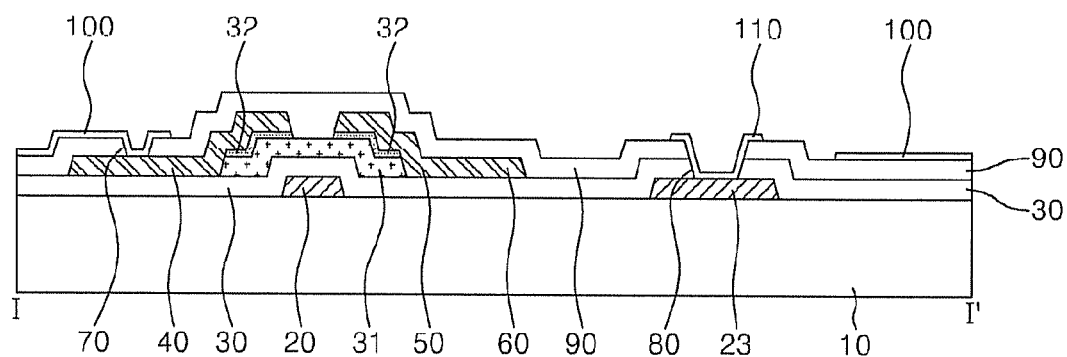
FIG. 2 is a cross-sectional view taken along line I-I' of FIG. 1.

FIG. 1 is a top view illustrating a TFT substrate according to one exemplary embodiment of the present invention, and FIG. 2 is a cross-sectional view taken along line I-I' of FIG. 1.

Referring to FIGS. 1 and 2, the TFT substrate comprises a gate line 21 arranged in a transverse direction, a data line 60 arranged in a perpendicular direction with respect to the gate line 21, a pixel electrode 100 arranged in a pixel region defined by the gate line 21 and the data line 60, a storage line 22 arranged in a parallel direction with respect to the gate line 21 to supply a storage voltage, and a storage extending portion 23 extending from the storage line 22 and arranged in a parallel direction with respect to the data line 60. The storage line 21 and the storage extending portion 23 constitute a storage electrode. The pixel electrode 100 has a diagonal side 100a adjacent to a crossing point of the gate line 21 and the data line 60. In other words, the diagonal side 100a of the pixel electrode 100 is formed by a corner cut off from the pixel electrode. The storage extending portion 23 overlaps a side of the pixel electrode 100 adjacent to the data line 60 and also has a diagonal side 23a corresponding to (and generally parallel with) the diagonal side 100a of the pixel electrode 100. The storage line 22 and the storage extending portion 23 constitute a light blocking pattern.

The gate line 21 supplies a scan signal, and the data line 60 supplies an image data signal. A gate insulating layer 30 (FIG. 2) is interposed between the gate line 21 and the data line 60. A TFT connected to the gate line 21 and the data line 60 is formed in the pixel region.

The TFT comprises a gate electrode 20 extending from the gate line 21, a source electrode 50 extending from the data line 60, a drain electrode 40 electrically connected to the pixel electrode 100, and a semiconductor layer 31 which has a channel area between the source and drain electrodes 50 and 40, and which overlaps the gate electrode 20 with the gate insulating layer 30 interposed therebetween. The TFT further comprises an ohmic contact layer 32 for providing ohmic contact between the source and drain electrodes 50 and 40, and the semiconductor layer 31. The TFT transmits the image data signal of the data line 60 to the pixel electrode 100 in response to the scan signal of the gate line 21.

A passivation film 90 is formed over the entire surface of a substrate 10. The pixel electrode 100 is formed on the passivation film 90 and is electrically connected to the drain electrode 40 via a pixel contact hole 70 formed through 15 the passivation film 90. The pixel electrode 100, which has received the image data signal from the TFT drives a liquid crystal layer to vary the transmissivity of light using a voltage difference with respect to the common electrode of the color filter substrate. The pixel electrode 100 comprises at least two slits 101 and 102 to divide the pixel region into a plurality of domains. The two slits 101 and 102 are symmetrically arranged at a predetermined angle on upper and low portions of the pixel electrode in a transverse axis direction. In an exemplary embodiment, the first and second slits 101 and 102 are perpendicularly arranged with respect to one another. The first and second slits 101 and 102 evenly disperse a direction of the fringe field in multiple directions to form a plurality of domains in a single pixel. The diagonal side 100a of the pixel electrode 100 (arranged adjacent to a crossing point of the gate line 21 and the data line 60) serves to prevent the pixel electrode 100 from overlapping a bridge electrode 110 which connects the storage extending portion 23 and the storage line 22 of the next stage.

The light blocking pattern includes the storage line 22 and the storage extending portion 23. The light blocking pattern overlaps the pixel electrode 100. The storage voltage is applied to the light blocking pattern so as to maintain a data voltage charged to the pixel electrode 100 during one frame.

The storage line 22 is arranged in a parallel direction with respect to the gate line 21 and supplies the storage voltage. The storage extending portion 23, extending from the storage line 22, is arranged in a parallel direction with respect to the data line 60.

The storage extending portion 23 is formed in a parallel direction with to the data line 60 and overlaps one side of the pixel electrode 100 adjacent to the data line 60. An end of the storage extending portion 23 is electrically connected to the storage line 22 of the next stage via the bridge electrode 110. The storage extending portion 23 has a diagonal side 23a substantially parallel to the diagonal side 100a of the pixel electrode 100 so as to prevent light leakage which may occur at an edge region of the pixel electrode 100. In addition, the storage line 22 has a diagonal side substantially parallel with respect to the diagonal side 110a of the pixel electrode 100 so as to prevent light leakage.

Accordingly, the light blocking pattern prevents light leakage which may occur at an edge region of the pixel electrode 100 due to misalignment of the color filter substrate and the TFT substrate.

Even where a column spacer located in an area "A" in FIG. 1 is caused to move by external shock or impact, light leakage is prevented by the diagonal side 23a of the end of the storage extending portion 23. Therefore, a texture defect which may occur at an edge region of the pixel electrode 100 is prevented. Particularly, even in a case where the column spacer is arranged adjacent to the blue unit pixel, the yellowish phenomenon can be prevented notwithstanding movement of the column spacer. Accordingly, the display quality of the LCD device is improved.

The end of the storage extending portion 23 is electrically connected to the bridge electrode 110 via a first contact hole 80, and the storage line 22 of the next stage is electrically connected to the bridge electrode 110 via a second contact hole 81. Thus, the storage line 22 and the storage extending portion 23 are electrically connected to one another by the bridge electrode 110.

In an exemplary embodiment, the bridge electrode 110 is made of a transparent conductive material such as, for example indium tin oxide ("ITO") or indium zinc oxide ("IZO").

FIGS. 3A to 3E are cross-sectional views illustrating a process for fabricating the TFT substrate of FIGS. 1 and 2 according to one exemplary embodiment of the present invention.

Figure 3A:
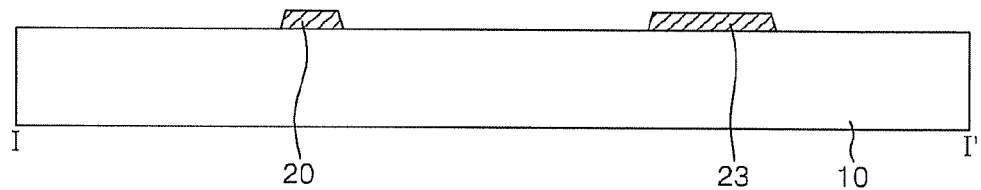
FIGS. 3A to 3E are cross-sectional views illustrating a process for fabricating the TFT substrate of FIGS. 1 and 2 according to one exemplary embodiment of the present invention.

Referring to FIG. 3A, a first conductive pattern group including the gate line 21 (not shown in FIG. 3A), the gate electrode 20, and the light blocking pattern is formed on the substrate 10 by using a first mask process. The light blocking pattern includes the storage line 22 and the storage extending portion 23 having a diagonal side.

More specifically, a first conductive layer is deposited on the substrate 10 using, for example, a sputtering technique. The first conductive layer may be formed from Al (aluminum), Cr (chromium), Cu (copper), Mo (molybdenum), an alloy(s) thereof, or a combination thereof. In addition, the first conductive layer may have a single layer structure or a multi-layer structure. The first conductive layer is patterned by a photolithography process using a first mask and an etching process to form the first conductive pattern group including the gate line 21, the gate electrode 20, the storage line 22, and the storage extending portion 23 having the diagonal side 23a. The storage line 22 has a diagonal side which is substantially parallel with respect to the diagonal side 110a of the pixel electrode 100 so as to prevent light leakage.

Figure 3B:
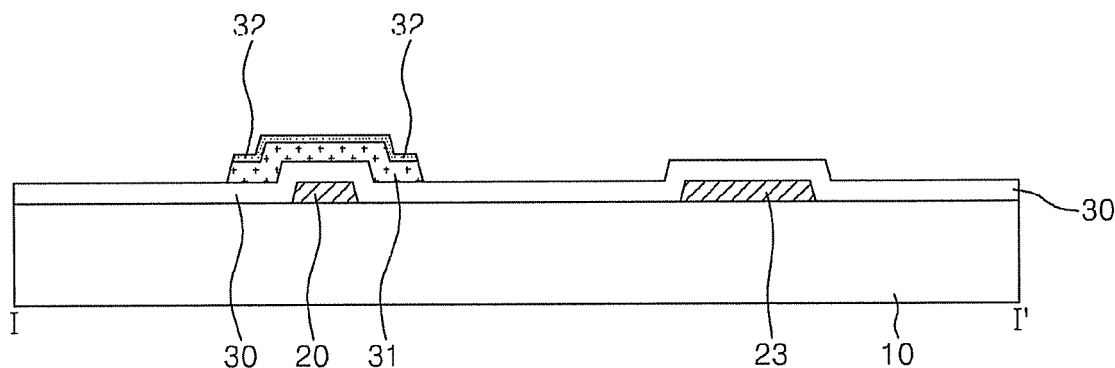

Referring to FIG. 3B, the gate insulating layer 30, the semiconductor layer 31, and the ohmic contact layer 32 are then sequentially formed on the substrate 10, having the first conductive pattern group previously formed thereon, by using a second mask process.

More specifically, the gate insulating layer 30, an amorphous silicon layer, and a high-density doped amorphous silicon layer are sequentially formed on the substrate 10 having the first conductive pattern group by using, for example, a plasma enhanced chemical vapor deposition ("PECVD") technique. The amorphous silicon layer and the high-density doped amorphous silicon layer are patterned by a photolithograph process using a second mask and an etching process so as to form the semiconductor layer 31 and the ohmic contact layer 32. The gate insulating layer 30 is, in an exemplary embodiment, made of an inorganic insulating material, such as $SiN_x$ or $SiO_x$.

Figure 3C:
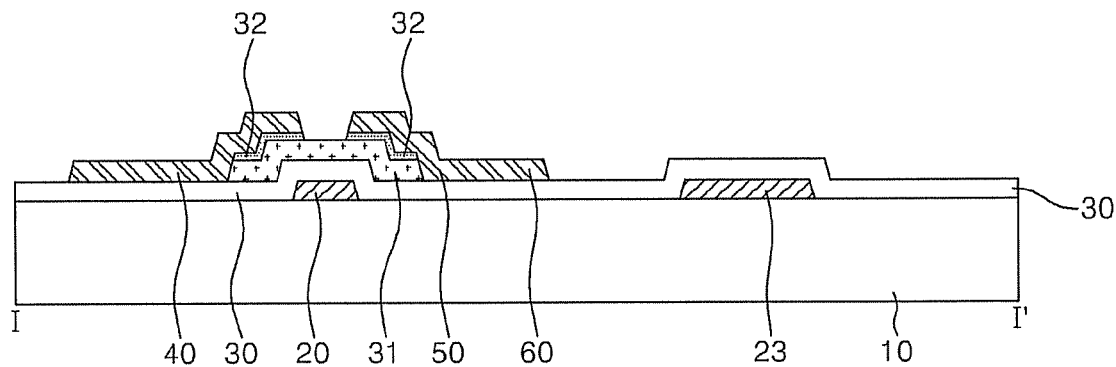

Referring to FIG. 3C, a second conductive pattern group, including the data line 60, the source electrode 50, and the drain electrode 40 is formed on the substrate 10, having the semiconductor layer 31 and the ohmic contact layer 32 previously formed thereon, by using a third mask process.

More specifically, the data line 60 is formed on the gate insulating layer 30 in a parallel direction with respect to the storage extending portion 23, and the source and drain electrodes 50 and 40 are formed on the gate insulating layer 30 so as to cover both ends of the ohmic contact layer 32. The source electrode 50 extends from the data line 60. In order to form the second conductive pattern group, a second conductive layer is deposited over the entire surface of the substrate 10 by using, for example, a sputtering technique and then patterned by a photolithography process using a third mask and an etching process. The second conductive layer may be formed from, for example, Al, Cr, Cu, Mo, an alloy(s) thereof, or a combination thereof. In addition, the second conductive layer may have a single layer structure or a multi-layer structure.

Figure 3D:
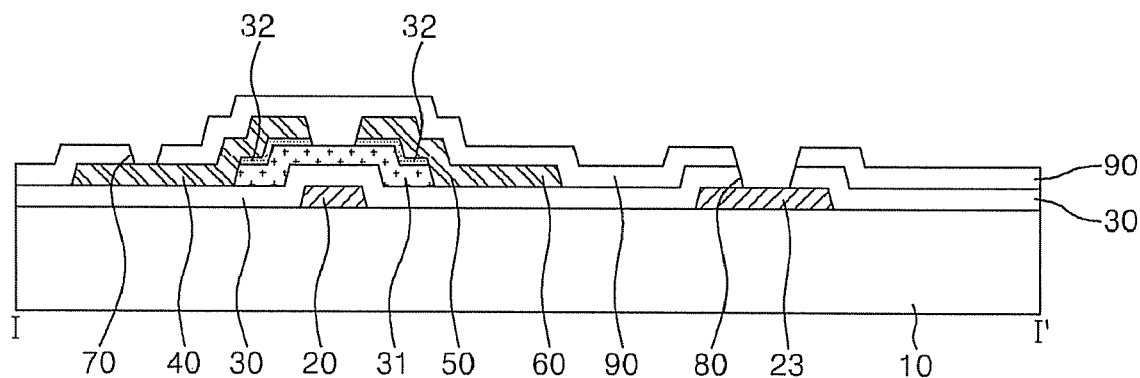

Referring to FIG. 3D, the passivation film 90 including the pixel contact hole 70 and the first and second contact holes 80 and 81 (contact hole 81 not shown in the cross sectional view of FIG. 3D) is formed over the entire surface of the substrate 10 by using a fourth mask process.

More specifically, the passivation film 90 is formed over the entire surface of the substrate 10 by using a deposition technique such as a PECVD technique or a spin coating technique. The pixel contact hole 70 and the first and second contact holes 80 and 81 are formed in the passivation film 90 by a photolithography process using a fourth mask and an etching process. The pixel contact hole 70 penetrates the passivation film 90 to expose a portion of the drain electrode 40, while the first contact hole 80 penetrates the gate insulating layer 30 and the passivation film 90 to expose a portion of the end portion of the storage extending portion 23, and the second contact hole 81 (FIG. 1) penetrates the gate insulating layer 30 and the passivation film 90 to expose a portion of the storage line 22 of the next stage. The passivation film 90 may be made of, for example, an organic insulating material or an inorganic insulating material similar to the gate insulating layer 30.

Figure 3E:
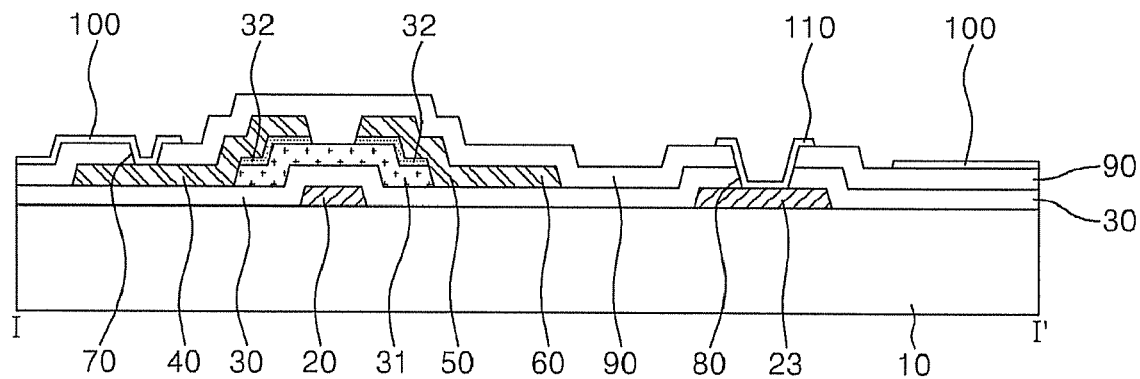

Finally, referring to FIG. 3E, the pixel electrode 100 and the bridge electrode 110 are formed on the passivation film 90 by using a fifth mask process.

More specifically, a transparent conductive layer is deposited on the passivation film 90 by a sputtering technique, for example. The transparent conductive layer is patterned by a photolithography process using a fifth mask and an etching process to thereby form the pixel electrode 100 and the bridge electrode 110. The first and second slits 101 and 102 are also patterned in the pixel electrode 100. The bridge electrode 110 is patterned so as to connect the end portion of the storage extending portion 23 to the storage line 22 of the next stage. Each corner portion of the pixel electrode 100 has a diagonal side in order to avoid overlapping with the bridge electrode 110. The transparent conductive layer is made of, for example, a transparent conductive material such as ITO, IZO, and tin oxide (TO). The pixel electrode 100 is electrically connected to the drain electrode 40 via the pixel contact hole 70, while the bridge electrode 110 is electrically connected to both the storage extending portion 23 and the storage line 22 of the next stage via the first and second contact holes 80 and 81, respectively.

Figure 4:
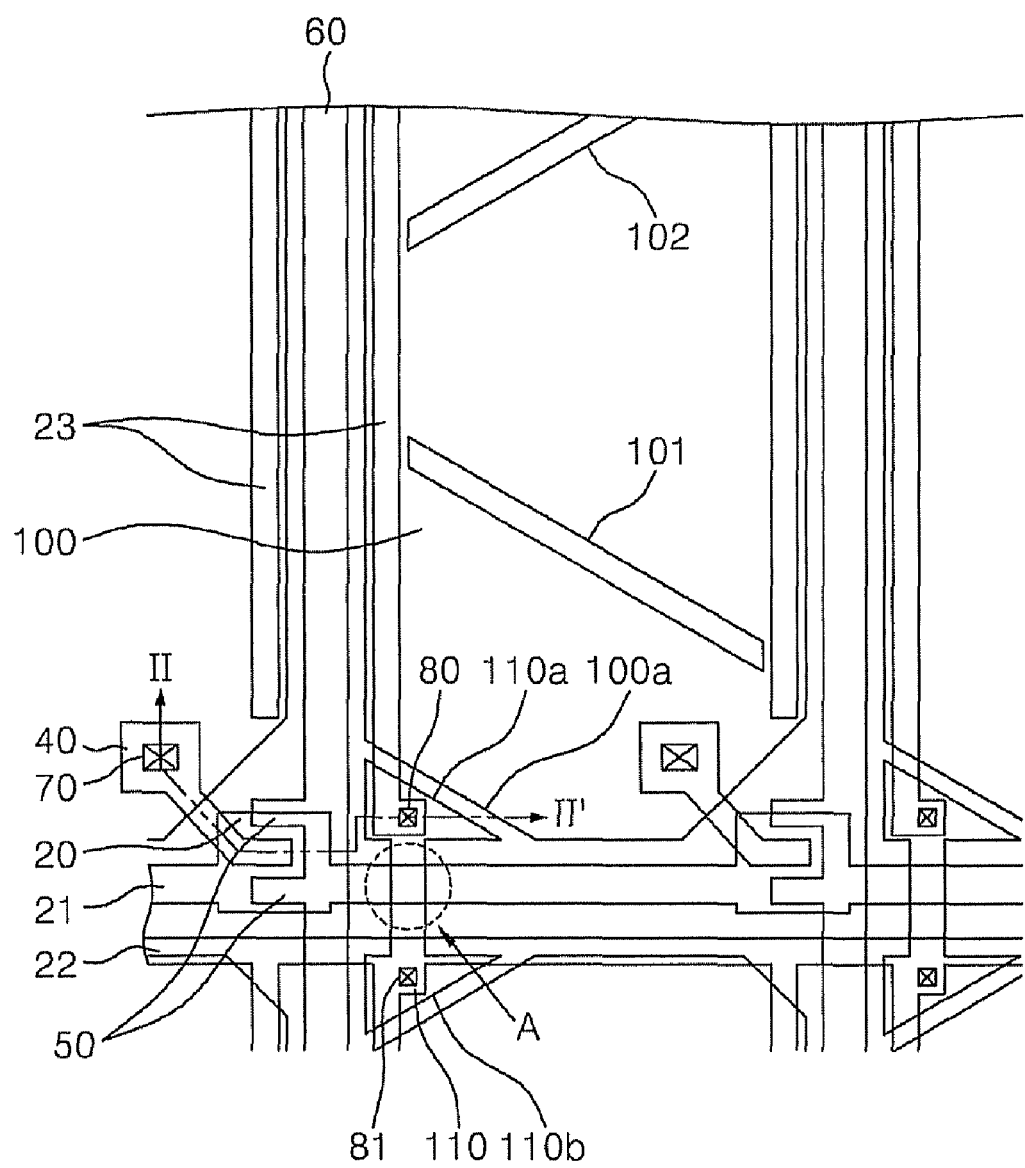
FIG. 4 is a top view illustrating a TFT substrate according to another exemplary embodiment of the present invention.
Figure 5:
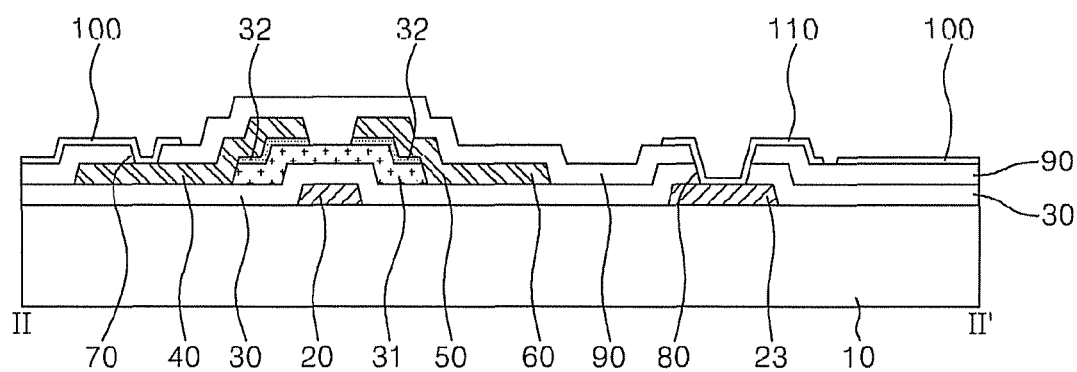
FIG. 5 is a cross-sectional view taken along line I-I' of FIG. 4.

FIG. 4 is a top view illustrating a TFT array substrate according to another exemplary embodiment of the present invention, and FIG. 5 is a cross-sectional view taken along line I-I' of FIG. 4.

The TFT substrate of the embodiment of FIGS. 4 and 5 includes the same or similar components as the TFT substrate of the embodiment of FIGS. 1 and 2, with the exception the shape of a portion of the bridge electrode 110 which is connected to the end portion of the storage extending portion 23. Thus, in the following description, identical portions of the description of this embodiment with respect to the earlier embodiments are omitted for purposes of simplicity.

Referring to FIGS. 4 and 5, the TFT array substrate comprises a gate line 21 arranged in a transverse direction, a data line 60 arranged in a perpendicular direction with respect to the gate line 21, a pixel electrode 100 arranged in a pixel region defined by the gate and data lines 21 and 60, a storage line 22 arranged in a parallel direction with respect to the gate line 21 to supply a storage voltage, a storage extending portion 23 extending from the storage line 22 and arranged in a parallel direction with respect to the data line 60, and a bridge electrode 110 which electrically connects the storage extending portion 23 to the storage line 22 of the next stage. The pixel electrode 100 has a diagonal side 100a adjacent to a crossing point of the gate line 21 and the data line 60. In other words, the diagonal side 100a of the pixel electrode 100 is formed by a corner cut off from the pixel electrode 100. The storage extending portion 23 overlaps a side of the pixel electrode 100 adjacent to the data line 60. However, in contrast to the embodiment of FIG. 1, the end of the storage extending portion 23 which is connected to the bridge electrode 110 does not have a diagonal portion. Instead, the bridge electrode 110 has at least one diagonal side 110a which corresponds to (and is substantially parallel to the diagonal side 100a of the pixel electrode 100. In the exemplary embodiment depicted, both ends of the bridge electrode 110 have the diagonal sides 110a and 110b. That is, one end of the bridge electrode 110 which is electrically connected to the storage extending portion 23 has the diagonal side 110a, while the other end of the bridge electrode 110 which is electrically connected to the storage line 22 of the next stage has the diagonal side 110b. The diagonal sides 110a and 110b of the bridge electrode 110 are substantially parallel with respect to the diagonal side 100a of the pixel electrode 100, thereby forming a horizontal electric field. The bridge electrode 110 is a light blocking pattern.

In an exemplary embodiment, the bridge electrode 110 is made of the same transparent conductive material as the pixel electrode 100. As a result of the above-described shape of the bridge electrode 110, the horizontal electric field is formed between the pixel electrode 100 and the bridge electrode 110, so that the liquid crystal molecules arranged at the corner portion of the pixel electrode 100 may be controlled. The electric field formed between the diagonal side 110a of the bridge electrode 110 and the diagonal side 100a of the pixel electrode 100 is horizontally formed by a fringe field formed therebetween and the liquid crystal molecules are vertically driven, thereby preventing light leakage. Accordingly, a texture defect which may occur by light leakage from an edge region of the pixel electrode 100 is prevented.

In a later process, the column spacer (not shown) is located at the area "A" where the gate line 21 and the bridge electrode 110 overlap. Even where the column spacer is moved by external physical shock or impact, the fringe field formed between the pixel electrode 100 and the bridge electrode 110 prevents the occurrence of abnormal texture, resulting in high display quality. In particular, even in the case where the column spacer is arranged adjacent to the blue unit pixel, the yellowish phenomenon can be prevented even though the column spacer moves.

FIGS. 6A to 6E are cross-sectional views illustrating a process for fabricating the TFT array substrate of the embodiment of FIGS. 4 and 5 according to another exemplary embodiment of the present invention.

The processes of FIGS. 6A to 6E are similar to or same as those of FIGS. 3A to 3E except that the bridge electrode has the diagonal side, and thus duplicated description is omitted.

Figure 6A:
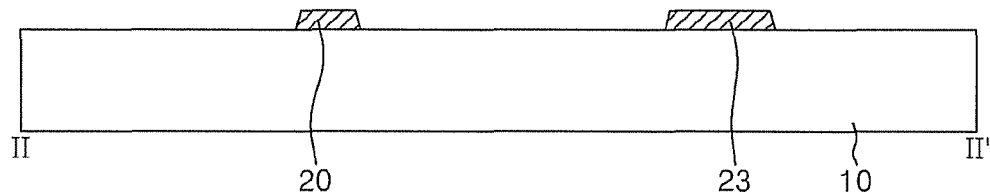
FIGS. 6A to 6E are cross-sectional views illustrating a process for fabricating the TFT substrate of FIGS. 4 and 5 according to another exemplary embodiment of the present invention.

Referring to FIG. 6A, a first conductive pattern group including the gate line 21 (not shown in FIG. 6A), the gate electrode 20, the storage line 22, and the storage extending portion 23 is formed on the substrate 10 by using a first mask process. In this embodiment, the end of the storage extending portion 23 which is connected to the bridge electrode 110 does not have the diagonal portion.

More specifically, a first conductive layer is deposited on the substrate 10 using, for example, a sputtering technique. The first conductive layer may be formed from, for example, Al, Cr, Cu, Mo, an alloy(s) thereof, or a combination thereof. In addition, the first conductive layer may have a single layer structure or a multi-layer structure. The first conductive layer is patterned by a photolithography process using a first mask and an etching process to form the first conductive pattern group including the gate line 21, the gate electrode 20, the storage line 22, and the storage extending portion 23.

Figure 6B:
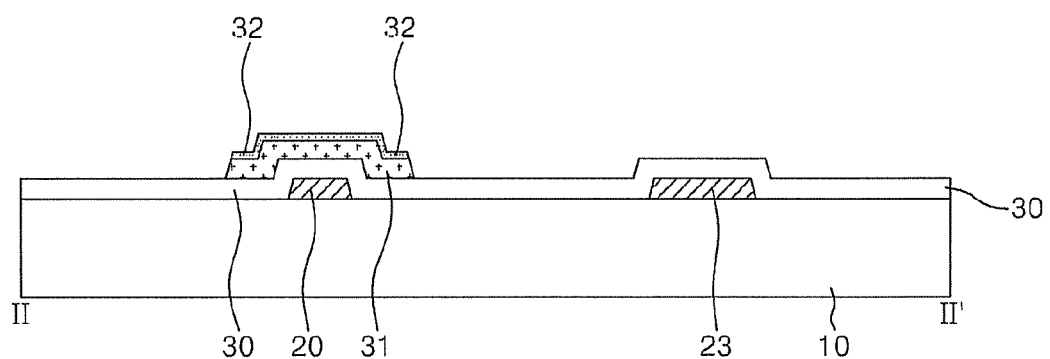
Figure 6C:
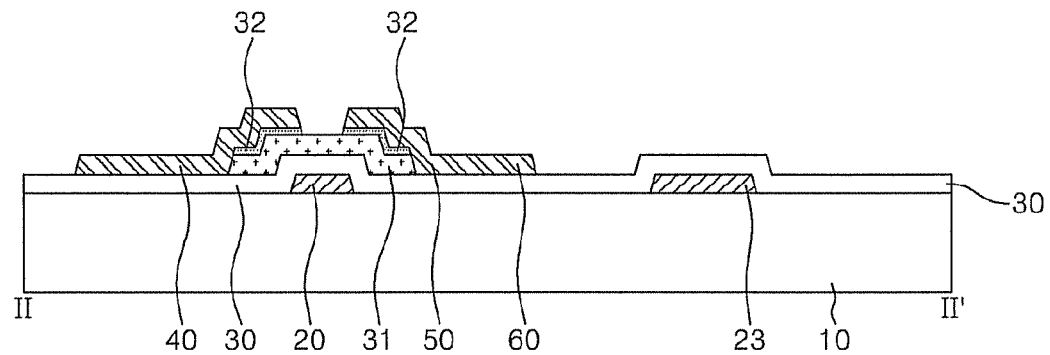
Figure 6D:
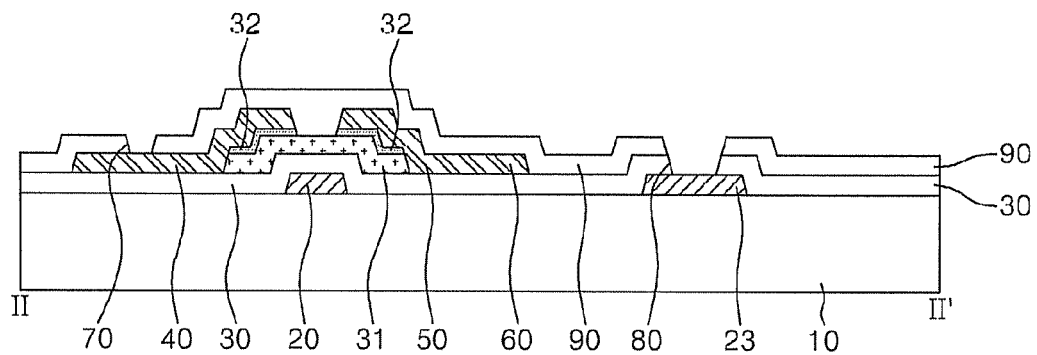

The processes of FIGS. 6B to 6D are same as those of FIGS. 3B to 3D, and thus duplicative descriptions thereof are omitted.

Figure 6E:
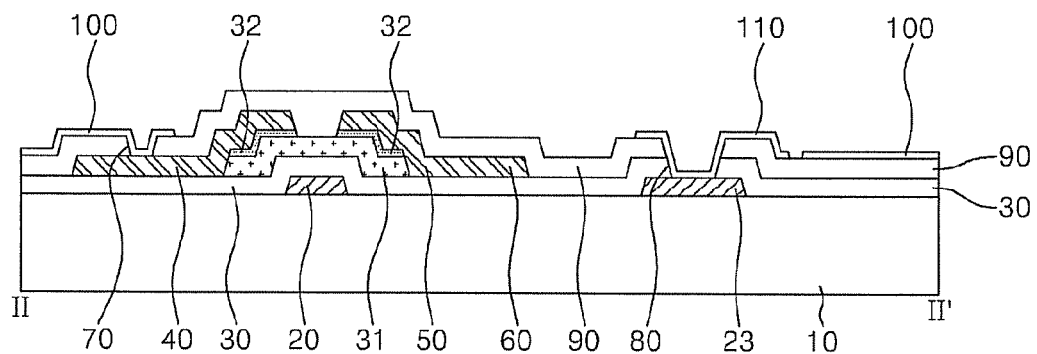

Referring to FIG. 6E, the pixel electrode 100 and the bridge electrode 110 are formed on the passivation film 90 by using a fifth mask process.

More specifically, a transparent conductive layer is deposited on the passivation film 90 by, for example, a sputtering technique. The transparent conductive layer is patterned by a photolithography process using a fifth mask and etching process to thereby form the pixel electrode 100 and the bridge electrode 110. The first and second slits 101 and 102 are also patterned in the pixel electrode 100. The bridge electrode 110 is patterned to connect the end portion of the storage extending portion 23 to the storage line 22 of the next stage. One end of the bridge electrode 110, which is electrically connected to the storage extending portion 23, has a diagonal portion 110a. The other end of the bridge electrode 110, which is electrically connected to the storage line 22 of the next stage, may also have a diagonal portion 110b. In an exemplary embodiment, both corner portions of the pixel electrode 100 have the diagonal sides to avoid the overlap with the bridge electrode 110. As a result of the above described shape of the bridge electrode 110, the fringe field is formed between the pixel electrode 100 and the bridge electrode 110. The transparent conductive layer is made of, for example, a transparent conductive material such as ITO, IZO and TO. The pixel electrode 100 is electrically connected to the drain electrode 40 via the pixel contact hole 70, while the bridge electrode 110 is electrically connected to both the storage extending portion 23 and the storage line 22 of the next stage via the first and second contact holes 80 and 81, respectively.

As described above, according to the LCD device of the present invention embodiments, at least one of the storage extending portion and the bridge electrode has a diagonal portion corresponding to the diagonal portion of the pixel electrode, so that a fringe field is formed between one of the storage extending portion and the bridge electrode and the pixel electrode, thereby preventing light leakage because the liquid crystal molecules are driven in a vertical direction by the fringe field. In addition, even where the column spacer is moved by an external physical shock, a texture defect is prevented and the display quality is improved.

Although the present invention has been described with reference to certain exemplary embodiments thereof, it will be understood by those skilled in the art that a variety of modifications and variations may be made to the present invention without departing from the spirit or scope of the present invention defined in the appended claims, and their equivalents.

What is claimed is:

1. A liquid crystal display (LCD) device, comprising:
a gate line arranged in one direction;
a data line arranged in a perpendicular direction to the gate line;
a pixel electrode arranged in a pixel region defined by the gate and data lines and having a diagonal side adjacent to a crossing portion of the gate and data lines; and
a light blocking pattern arranged in a parallel direction with respect to the diagonal side of the pixel electrode and preventing light leakage,
wherein the light blocking pattern is formed from the same metal on the same plane as the gate line.

2. The LCD device of claim 1, wherein the light blocking pattern comprises:
a first storage line arranged in a parallel direction with respect to the gate line to supply a storage voltage; and
a storage extending portion arranged in a parallel direction with respect to the data line and extending from the first storage line, wherein the storage extending portion overlaps one side of the pixel electrode.

3. The LCD device of claim 2, further comprising a bridge electrode electrically connecting the storage extending portion of the first storage line with a second storage line.

4. The LCD device of claim 3, wherein the bridge electrode is formed from the same metal on the same plane as the pixel electrode.

5. A liquid crystal display (LCD) device, comprising:
a gate line arranged in one direction;
a data line arranged in a perpendicular direction to the gate line;
a pixel electrode arranged in a pixel region defined by the gate and data lines and having a diagonal side adjacent to a crossing portion of the gate and data lines; and
a light blocking pattern arranged in a parallel direction with respect to the diagonal side of the pixel electrode and preventing light leakage,
wherein the light blocking pattern is formed from the same metal on the same plane as the pixel electrode.

6. The LCD device of claim 5, further comprising:
a first storage line arranged in a parallel direction with respect to the gate line to supply a storage voltage; and
a storage extending portion arranged in a parallel direction with respect to the data line and extending from the first storage line,
wherein the storage extending portion overlaps one side of the pixel electrode, and wherein the light blocking pattern electrically connects the storage extending portion to a second storage line and has a diagonal side which is substantially parallel with respect to the diagonal side of the pixel electrode.

7. The LCD device of claim 1, wherein the light blocking pattern receives a storage voltage.

8. A method of forming a liquid crystal display (LCD) device, the method comprising:
forming a gate line arranged in one direction and a data line arranged in a perpendicular direction to the gate line;

forming a pixel electrode arranged in a pixel region defined by the gate and data lines and having a diagonal side adjacent to a crossing portion of the gate and data lines; and forming a light blocking pattern arranged in a parallel direction with respect to the diagonal side of the pixel electrode such that the light blocking pattern is formed from the same metal on the same plane as the gate line.

9. The method of claim 8, wherein forming the light blocking pattern comprising:

forming a first storage line arranged in a parallel direction with respect to the gate line; and forming a storage extending portion arranged in a parallel direction with respect to the data line and extending from the first storage line, wherein the storage extending portion overlaps one side of the pixel electrode.

10. The method of claim 9, wherein forming the light blocking pattern further comprising:

forming a part of the storage line to be substantially parallel with respect to the diagonal side of the pixel electrode; and forming one side of an end of the storage extending portion to be substantially parallel with respect to the diagonal side of the pixel electrode.

11. The method of claim 10, further comprising forming a bridge electrode electrically connecting the storage extending portion of the first storage line with a second storage line.

12. The method of claim 11, wherein forming the bridge electrode comprising:

forming one side of the bridge electrode to be substantially parallel with respect to the diagonal side of the pixel electrode with the same metal on the same plane as the pixel electrode.

13. A method of forming a liquid crystal display (LCD) device, the method comprising:

forming a gate line arranged in one direction and a data line arranged in a perpendicular direction to the gate line;

forming a pixel electrode arranged in a pixel region defined by the gate and data lines and having a diagonal side adjacent to a crossing portion of the gate and data lines; and forming a light blocking pattern arranged in a parallel direction with respect to the diagonal side of the pixel electrode such that the light blocking pattern is formed from the same metal on the same plane as the pixel electrode while forming the pixel electrode.

14. The method of claim 13, further comprising:

forming a first storage line arranged in a parallel direction with respect to the gate line;

forming a storage extending portion arranged in a parallel direction with respect to the data line and extending from the first storage line; and forming the light blocking pattern electrically connecting the storage extending portion to a second storage line.

* * * * *